(12) United States Patent
Ochiai et al.

(10) Patent No.: US 8,424,906 B2
(45) Date of Patent: Apr. 23, 2013

(54) PASSENGER PROTECTION DEVICE FOR VEHICLE

(75) Inventors: Fumiharu Ochiai, Wako (JP); Koji Ikeda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/264,531

(22) PCT Filed: Jan. 26, 2010

(86) PCT No.: PCT/JP2010/050941
§ 371 (c)(1),
(2), (4) Date: Oct. 14, 2011

(87) PCT Pub. No.: WO2010/122827
PCT Pub. Date: Oct. 28, 2010

(65) Prior Publication Data
US 2012/0032427 A1    Feb. 9, 2012

(30) Foreign Application Priority Data

Apr. 21, 2009 (JP) ................................. 2009-102965

(51) Int. Cl.
*B60R 21/16* (2006.01)
(52) U.S. Cl.
USPC ..................................................... 280/730.2

(58) Field of Classification Search ............... 280/730.2, 280/743.1, 741, 742
See application file for complete search history.

(56) References Cited

U.S. PATENT DOCUMENTS

| 7,740,270 | B2 * | 6/2010 | Imamura ..................... 280/730.2 |
| 7,762,575 | B2 * | 7/2010 | Jang et al. ..................... 280/729 |
| 8,083,255 | B2 * | 12/2011 | Okimoto et al. ........... 280/730.2 |
| 2002/0014762 | A1 | 2/2002 | Bakhsh et al. |

FOREIGN PATENT DOCUMENTS

| JP | 2002-362293 | 12/2002 |
| JP | 2007-290700 | 11/2007 |

* cited by examiner

*Primary Examiner* — Faye M. Fleming
(74) *Attorney, Agent, or Firm* — Rankin, Hill & Clark LLP

(57) ABSTRACT

Disclosed is a passenger protection device provided with a side curtain airbag which expands in the form of a curtain, along the inner surface of a side portion of a vehicle. A side curtain airbag (31) is comprised of a gas introduction chamber (40) which introduces gas; and lower expansion portions (51, 52) which are expanded in the lower portion of the gas introduction chamber by the gas introduced from the gas introduction chamber. The gas introduction chamber has a plurality of large upper expansion portions (42, 43, 44) which are arranged in the longitudinal direction of a vehicle, so as to be respectively positioned in a plurality of pillars (15, 16, 17). The large upper expansion portions expand more widely than small expansion portions (45, 46), i.e., other portions of the gas introduction chamber, in the width direction of a vehicle.

12 Claims, 8 Drawing Sheets

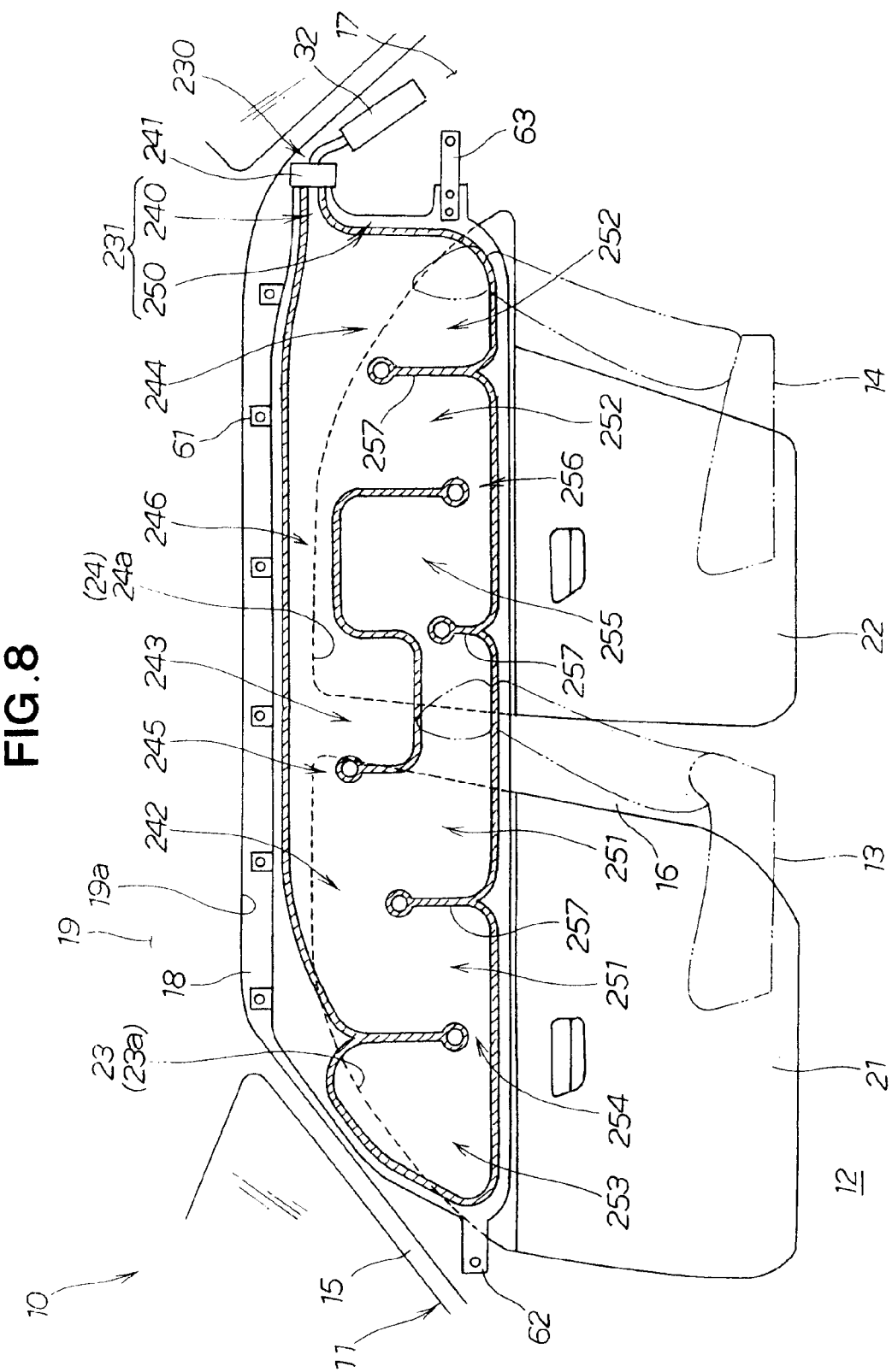

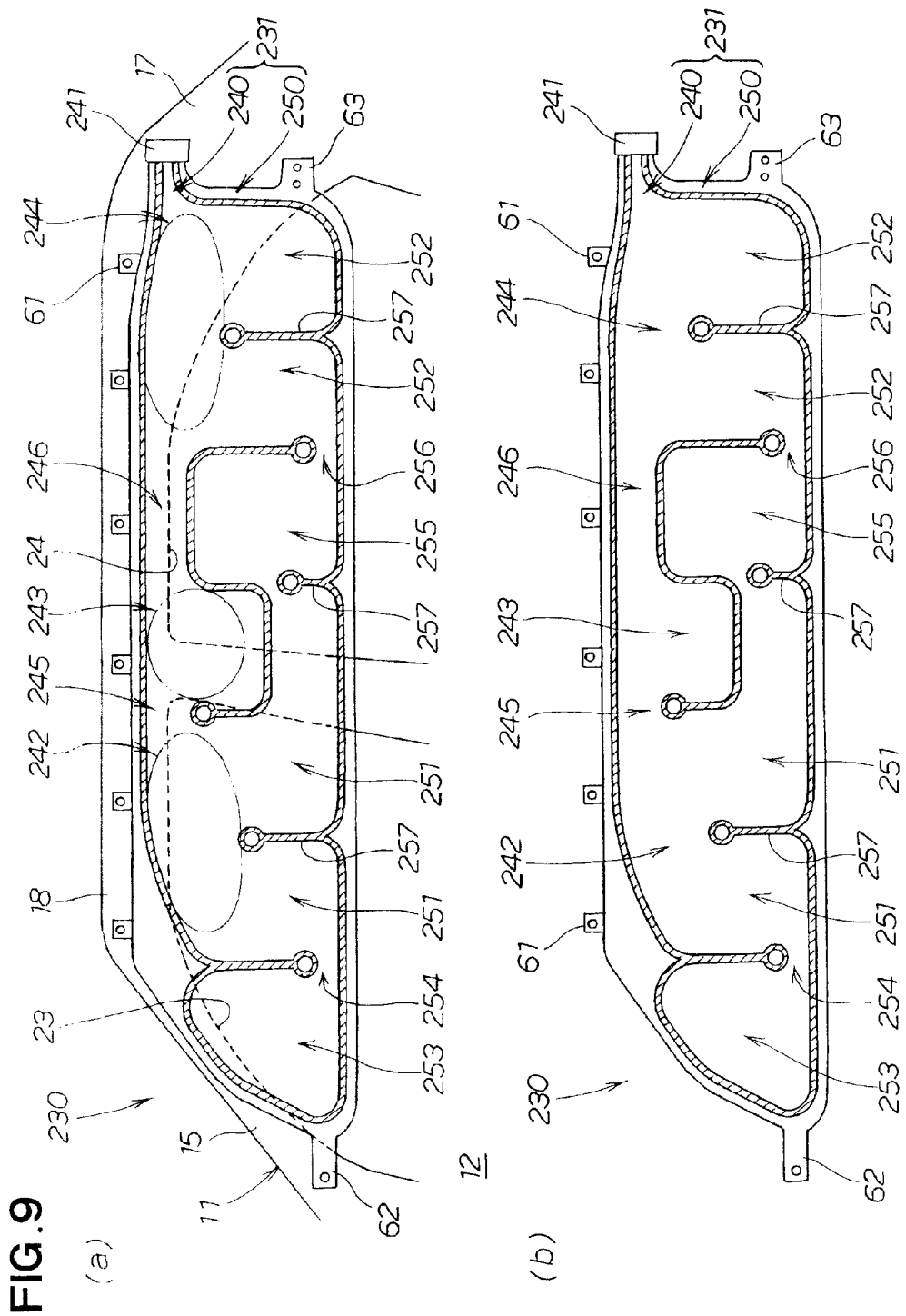

PASSENGER PROTECTION DEVICE FOR VEHICLE

TECHNICAL FIELD

The present invention relates generally to vehicle occupant protection apparatus which are constructed to deploy, in a passenger compartment, a side curtain airbag in a curtain-like shape along a window (side window) of the vehicle.

BACKGROUND ART

In recent years, there have been developed techniques for enhancing performance for protecting a vehicle occupant, particularly the head of the vehicle occupant, when impact force has been applied to a side section of the vehicle. For such a type of vehicle occupant protection apparatus, a technique has been developed, according to which a side curtain airbag is stored in a folded configuration or position along a side corner of a roof (roof rail) of a vehicle body so that the side curtain airbag can be deployed in a curtain shape along a vehicle window when the vehicle has been subjected to impact force greater than a predetermined intensity. Such vehicle occupant protection apparatus are disclosed, for example, in patent literature 1 and patent literature 2.

In the vehicle occupant protection apparatus disclosed in patent literature 1 and patent literature 2, the side curtain airbag has an upper communication passage for introducing gas from an inflator, and a plurality of cells (inflation portions) that inflate by gas flowing thereinto via the upper communication passage. The upper communication passage extends in a front-rear direction of the vehicle body, and the plurality of cells are arranged in the front-rear direction of the vehicle body under the upper communication passage. The cells are arranged in such a manner that their upper ends differ in height alternately. Because the upper ends of the cells are located non-uniformly in a vertical or up-down direction, the gas flows from the upper communication passage into the cells with time differences.

However, deployment of the side curtain airbag disclosed in patent literature 1 and patent literature 2, where only the upper communication passage is provided along the roof rail, cannot sufficiently protect vehicle occupants when the vehicle occupants are brought into secondary collisions against upper portions of a front pillar, center pillar and rear pillar and neighborhoods thereof.

Emergency where impact force is applied to a side portion of the vehicle is encountered in various occasions, such as a lateral collision, rollover, etc. of the vehicle. Thus, there has been a demand for the side curtain airbag to achieve an enhanced vehicle protection performance in such an emergency.

Prior Art Literature

Patent Literature 1: Japanese Patent No. 3626701
Patent Literature 1: Japanese Patent No. 3999475

SUMMARY OF INVENTION

Technical Problem

It is therefore an object to provide an improved technique which can enhance a vehicle occupant protection effect or performance of a vehicle occupant protection effect apparatus provided with a side curtain airbag.

Solution to Problem

According to an aspect of the present invention, there us provided a vehicle occupant protection apparatus, which comprises: a side curtain airbag stored folded along a side portion of a roof of a vehicle body; and an inflator for supplying gas to the side curtain airbag so that the side curtain airbag is inflated and deployed in a curtain shape along an inner surface of a vehicle window, the side curtain airbag including: a gas introduction chamber extending in a front-rear direction of the vehicle body along the side portion of the roof, the gas introduction chamber introducing thereinto the gas in the front-rear direction of the vehicle body; and a lower inflation portion inflatable under the gas introduction chamber by the gas flowing from the gas introduction chamber into the lower inflation portion, the gas introduction chamber including a plurality of upper large inflation portions disposed adjacent to respective ones of a plurality of pillars of the vehicle body and arranged in the front-rear direction of the vehicle body, each of the plurality of upper large inflation portions being inflatable in a vehicle width direction by a greater amount than a small inflation portion that is another inflation portion than the upper large inflation portions in the gas introduction chamber.

Preferably, the plurality of upper large inflation portions include a front-pillar large inflation portion that, as the side curtain airbag is deployed, inflates to a region rearward of the front pillar along a rear upper portion of the front pillar of the plurality of pillars.

Preferably, the plurality of upper large inflation portions include a rear-pillar large inflation portion that, as the side curtain airbag is deployed, inflates to a region forward of the rear pillar along a front upper portion of the rear pillar of the plurality of pillars.

Preferably, the side curtain airbag includes a distortion restraint portion for restraining the lower inflation portion from being distorted in the front-rear direction of the vehicle body when the side curtain airbag has been deployed, and the distortion restraint portion is formed on the lower inflation portion so as to positionally correspond to at least an intermediate position of the plurality of upper large inflation portions.

Preferably, the lower inflation portion includes a sub inflation portion that is located near a front edge of the vehicle window when the side curtain airbag is in a deployed position.

Advantageous Effects of Invention

In the present invention, the gas introduction chamber of the side curtain airbag extends along the side portion of the roof (i.e., along the upper edge of the vehicle window). The gas introduction chamber includes the plurality of upper large inflation portions arranged in the front-rear direction of the vehicle body, and these upper large inflation portions are disposed in correspondence with respective positions of the plurality of pillars of the vehicle body. Once the gas is introduced from the inflator into the gas introduction chamber in the event of an emergency (first or primary collision), such as a lateral collision or rollover of the vehicle, the side curtain airbag is deployed in a curtain shape along the inner side surface of the vehicle. By the gas flowing from the gas introduction chamber to the lower inflation portion, the lower inflation portion inflates to protect the vehicle occupant. During that time, the plurality of upper large inflation portions inflate in the vehicle width direction by a greater amount than the lower inflation portion disposed between and in communication with the upper large inflation portions. Namely, the upper large inflation portions inflate greatly in the neighborhood of the plurality of pillars and in the neighborhood of the vehicle window.

Namely, according to the present invention, as the side curtain airbag is deployed in a curtain shape, the lower inflation portion disposed under the gas introduction chamber inflates, and the plurality of upper large inflation portions greatly inflate in the vehicle width direction. The thus-inflated upper large inflation portions separate between upper portions of the plurality of pillars and neighborhoods thereof and one or more vehicle occupants. As a result, the present invention can enhance the vehicle occupant protection effect or performance when the vehicle occupants are brought into collisions against the inner surface of the vehicle body, i.e. at the time of a so-called second or secondary collision, following occurrence of the first or primary collision of the vehicle. Thus, in the event of an emergency, such as a lateral collision or rollover of the vehicle, the present invention can sufficiently protect the vehicle occupants in the neighborhoods of the plurality of pillars and in the neighborhoods of the upper edges of the vehicle windows.

Further, as the side curtain airbag is deployed in a curtain shape, the front-pillar upper large inflation portion inflates to a region rearward of the front pillar along a rear upper portion of the front pillar. The thus-inflated front-pillar upper large inflation portion separates between an upper portion of the front pillar and neighborhood thereof and the vehicle occupant. As a result, the present invention can enhance the vehicle occupant protection effect when the vehicle occupants are brought into a collision against the inner surface of the vehicle body, i.e. at the time of a so-called secondary collision, following occurrence of the primary collision of the vehicle. Thus, in the event of an emergency, such as a lateral collision or rollover of the vehicle, the present invention can sufficiently protect the vehicle occupant in the neighborhood of the front pillar and in the neighborhood of the upper edge of the vehicle window.

Furthermore, as the side curtain airbag is deployed in a curtain shape, the rear-pillar upper large inflation portion inflates to a region forward of the rear pillar along a front upper portion of the rear pillar. The thus-inflated rear-pillar upper large inflation portion separates between an upper portion of the rear pillar and neighborhood thereof and the vehicle occupant. As a result, the present invention can enhance the vehicle occupant protection effect when the vehicle occupant is brought into a collision against the inner surface of the vehicle body, i.e. at the time of a so-called secondary collision, following occurrence of the primary collision of the vehicle. Thus, in the event of an emergency, such as a lateral collision or rollover of the vehicle, the present invention can sufficiently protect the vehicle occupant in the neighborhood of the rear pillar and in the neighborhood of the upper edge of the vehicle window.

Furthermore, the side curtain airbag of the present invention includes a distortion restraint portion for restraining the lower inflation portion from being distorted in the front-rear direction of the vehicle body when the side curtain airbag has been deployed. As the plurality of upper large inflation portions inflate, the lower inflation portion disposed under the gas introduction chamber can be distorted due to the influence of the inflation of the upper large inflation portions. If distortion of the lower inflation portion can be restrained, then the entire side curtain airbag would be much less likely to be distorted in the vehicle width direction. Thus, the present invention can restrain distortion of the entire side curtain airbag, as a result of which the present invention can even further enhance the vehicle occupant protection effect by the side curtain airbag.

Furthermore, in the present invention, the sub inflation portion is located near the front edge of the vehicle window when the side curtain airbag is in the deployed position. Thus, the present invention can even further enhance the vehicle occupant protection effect when the vehicle occupant has been brought to a secondary collision against the neighborhood of the front edge of the window. Further, when the vehicle occupant has hit the lower inflation portion, e.g. when the vehicle occupant has been brought into a secondary collision against the neighborhood of the front edge of the window, the present invention can cause the inner pressure of the lower inflation portion to escape to the sub inflation portion. Thus, the present invention can restrain increase of the inner pressure of the lower inflation portion.

BRIEF DESCRIPTION OF DRAWINGS

FIG. 8 is a side view showing a vehicle with a side curtain airbag, constituting a third embodiment of the vehicle occupant protection apparatus of the present invention, in a deployed position; and FIG. 9 is a view showing the side curtain airbag of FIG. 8 in the deployed position.

DESCRIPTION OF EMBODIMENTS

Embodiment 1

Figure 1:
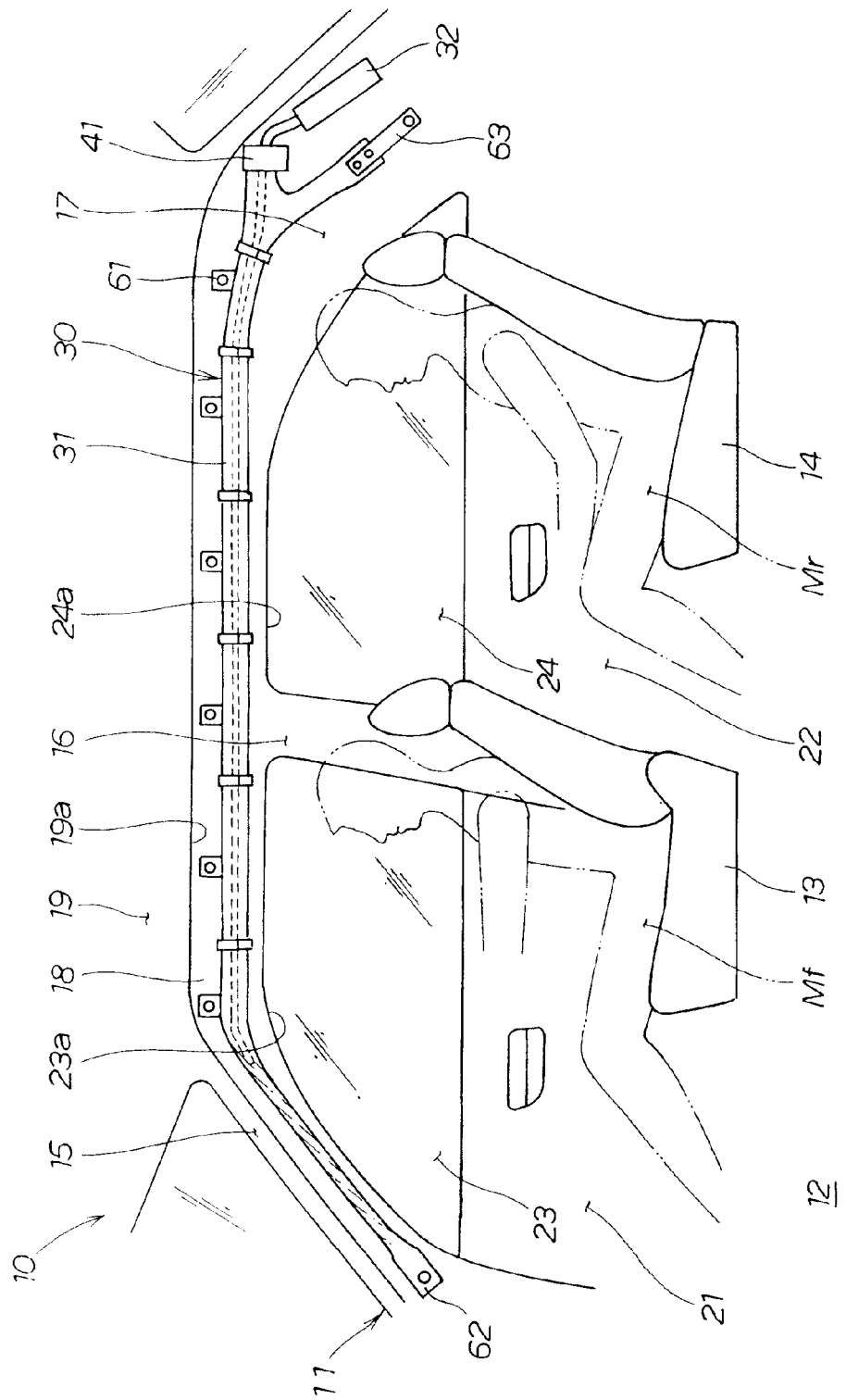
FIG. 1 is a side view of a vehicle having a side curtain airbag, constituting a first embodiment of a vehicle occupant protection apparatus of the present invention, stored in a folded position.

As shown in FIG. 1, a vehicle 10 includes a vehicle body 11 of a monocoque construction, which includes two, i.e. front and rear, seats 13 and 14 provided in a passenger compartment 12. A vehicle occupant Mf, such as a human driver, is seated in the front seat 13, and another vehicle occupant Mr is seated in the rear seat 14.

The vehicle body 11 includes a front pillar 15, a center pillar 16, a rear pillar 17, and a roof side rail 18 fixedly connected to the respective upper ends of the pillar 15, 16 and 17. The roof side rail 18 is an elongated member extending in a front-rear direction of the vehicle body 11 and supports a roof 19. The roof side rail 18 is disposed along a side edge (side portion or side portion corner) 19a of the roof 19.

The vehicle body 11 includes a front side door 21 provided between the front pillar 15 and the center pillar 16, and a rear side door 22 provided between the center pillar 16 and the rear pillar 17. The front side door 21 is disposed adjacent to the front seat 13 and has a vehicle window (front window 23) in its upper half portion. The rear side door 22 is disposed adjacent to the rear seat 14 and has a vehicle window (rear window 24) in its upper half portion.

A first embodiment of a vehicle occupant protection apparatus 30 is provided on the roof side rail 18. More specifically, the vehicle occupant protection apparatus 30 includes a side curtain airbag 31 mounted in a stored (folded or wound) state on the roof side rail 18 along the side edge 19a of the roof 19, i.e. along the upper edges 23a and 24a of the windows 23 and 24 of the vehicle body 11. The side curtain airbag 31 will hereinafter be referred to simply as "airbag 31".

In the vehicle occupant protection apparatus 30, gas is produced from an inflator 32 once impact force greater than a predetermined intensity is applied to a side section of the vehicle 10, and the thus-produced gas is supplied to the airbag 31 so that the airbag 31 is deployed toward the interior of the passenger compartment 12 along the windows 23 and 24. Such a vehicle occupant protection apparatus 30 is also called "side curtain airbag apparatus".

Figure 2:
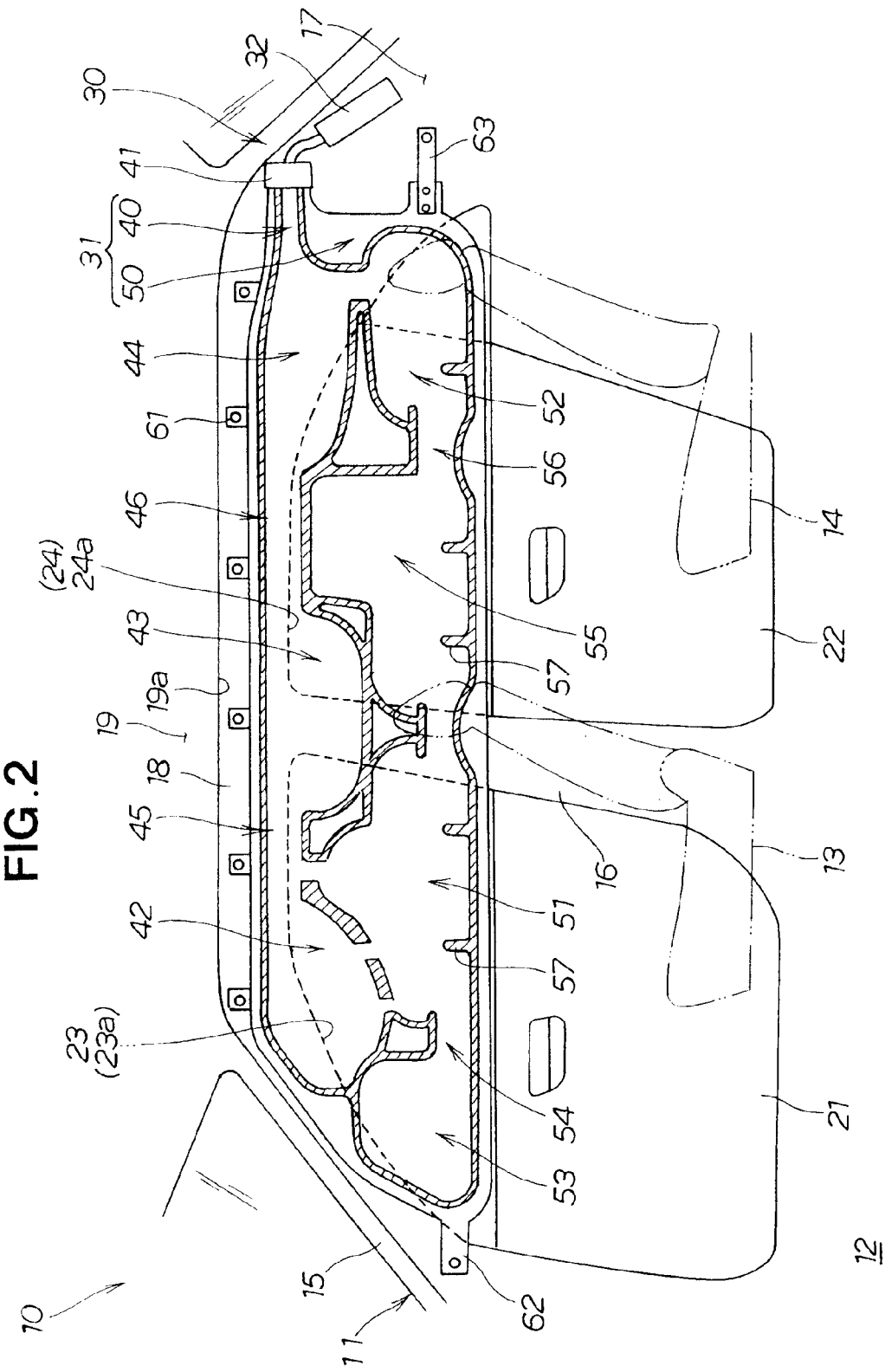
FIG. 2 is a side view showing the vehicle with the first embodiment of the side curtain airbag in a deployed position.

As shown in FIG. 2, the airbag 31 deployed within the passenger compartment 12 protects the vehicle occupants Mf and Mr, seated in the respective seats 13 and 14, by not only covering the windows 23 and 24 but also absorbing impact that acts on the vehicle occupants Mf and Mr. The inflator 32 (gas supply source 32) is not only mounted on the rear pillar 17 but also connected to a gas inlet port 41 of the airbag 31.

Figure 3:
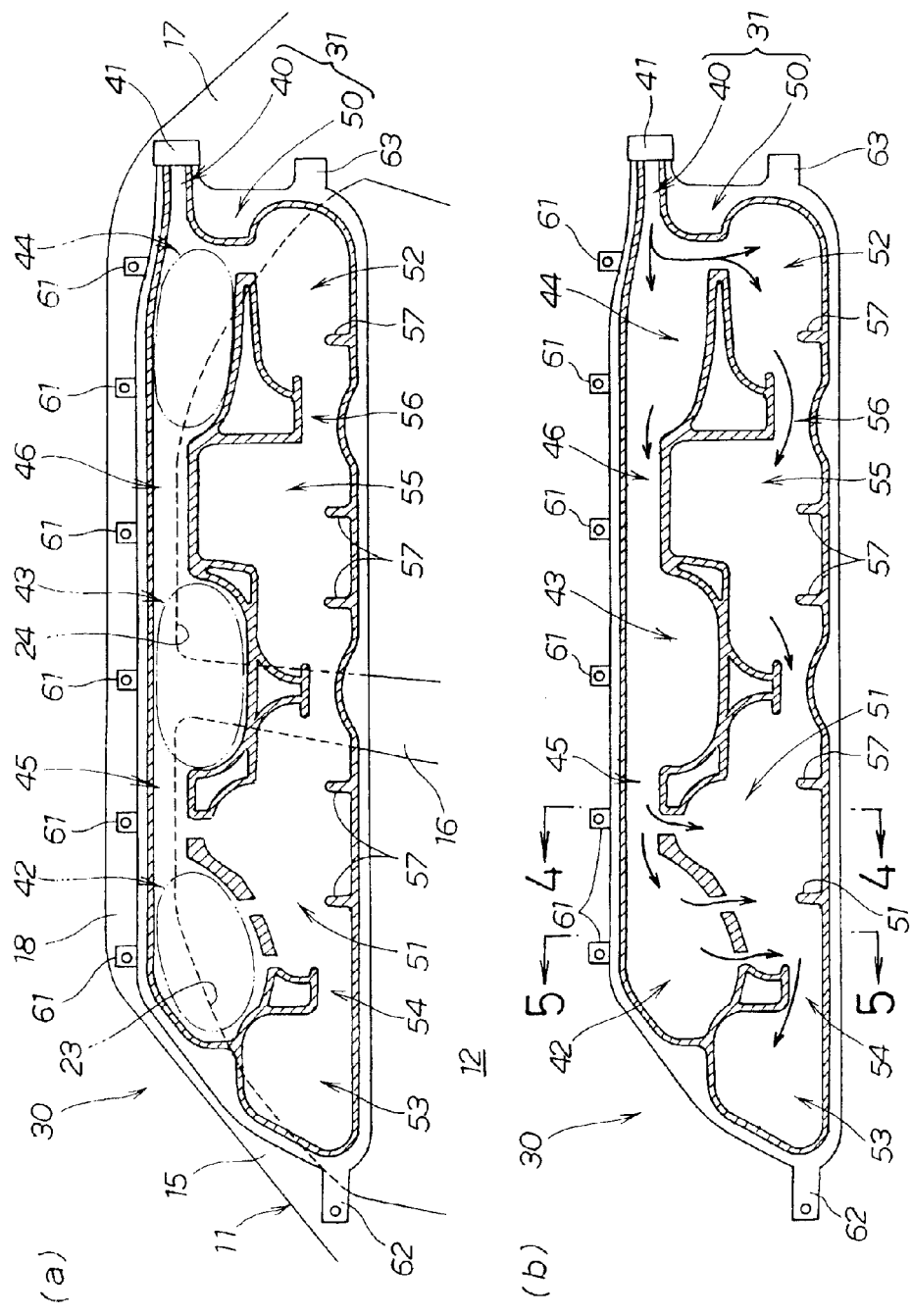
FIG. 3 is a view showing the side curtain airbag of FIG. 2 in the deployed position.

Next, with reference to (a) and (b) of FIG. 3, the airbag 31 will be described in detail. FIG. 3 shows the airbag 31 deployed within the passenger compartment. The airbag 31 is formed, for example, of a pair of outer and inner flexible sheets, such as fabrics having airtightness. The airbag 31 includes a gas introduction chamber 40 and a deployment section 50.

The gas produced from the inflator 32 flows in the front-rear direction of the vehicle body into the gas introduction chamber. This gas introduction chamber 40 is formed in a substantially cylindrical shape extending in the front-rear direction of the vehicle body along the side edge 19a of the roof 19. The gas inlet port 41 for introducing the gas from the inflator 32 is provided at the rear end of the gas introduction chamber 40.

As shown in (a) of FIG. 3, the gas introduction chamber 40 has a plurality of upper large inflation portions 42, 43 and 44 arranged in the vehicle body front-rear direction in such a manner that the upper large inflation portions 42, 43 and 44 are located in correspondence with the respective positions of the positions of the pillars 15, 16 and 17. These upper large inflation portions 42, 43 and 44 are in communication with one another via a plurality of small inflation portions 45 and 46, and they inflate greatly in a vehicle width direction (i.e., in a direction toward and away from a reader of FIG. 3) in such a manner that they take on a greater thickness than the small inflation portions 45 and 46 inflated at the time of deployment of the airbag 31. More specifically, the plurality of upper large inflation portions 42, 43 and 44 are three upper large inflation portions, i.e. a front-pillar large inflation portion 42, a center-pillar large inflation portion 43 and a rear-pillar large inflation portion 44.

Figure 4:
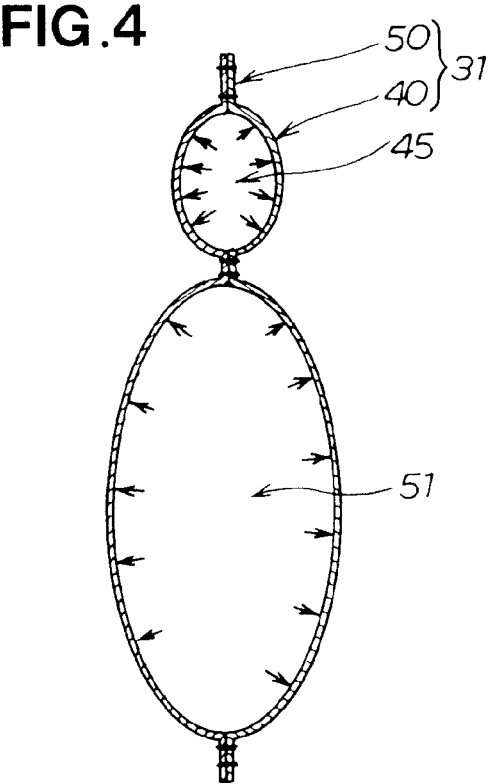
FIG. 4 is an enlarged sectional view taken along line 4-4 of FIG. 3.
Figure 5:
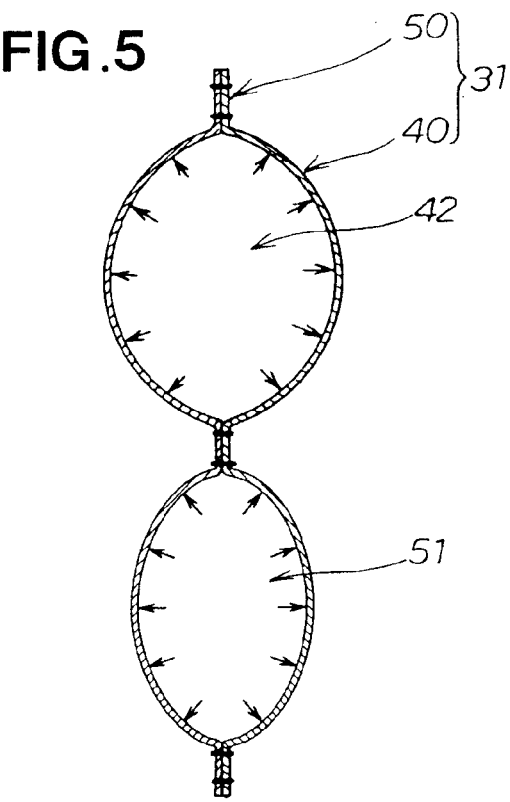
FIG. 5 is an enlarged sectional view taken along line 5-5 of FIG. 3.

As the airbag 31 is deployed, the front-pillar large inflation portion 42 inflate to the front pillar 15 and to a region rearward of the front pillar 15 along a rear upper edge portion of the front pillar 15. As shown in FIGS. 3 to 5, as the gas flows into the gas introduction chamber 40, the front-pillar large inflation portion 42 inflates to a thickness greater than the small inflation portion 45 inflated. It is preferable that each of the upper large inflation portions 42, 43 and 44 in the inflated position have a greater thickness (in the vehicle width direction) than each of lower inflation portions 51 and 52.

As the airbag 31 is deployed, the center-pillar large inflation portion 43 inflates to an upper portion of the center pillar 16 and regions in front of and behind the center pillar 16.

As the airbag 31 is deployed, the rear-pillar large inflation portion 44 inflates to the rear pillar 17 and a region in front of the rear pillar 17 along a front upper edge portion of the rear pillar 17.

The deployment section 50 is a sheet-shaped member that is deployable in a curtain shape along the inner surface of each of the windows 23 and 24 and thereby protects the vehicle occupants Mf and Mr (FIG. 1). The deployment section 50 includes a plurality of, e.g., a pair of front and rear, lower inflation portions 51 and 52, that inflate with pressure of the gas as the deployment section 50 is deployed. These lower inflation portions 51 and 52 inflate greatly, in the vehicle width direction, under the gas introduction chamber 40, by the gas flowing from the gas introduction chamber 40 into the lower inflation portions 51 and 52. The first lower inflation portion 51 is located in a front half region of the deployment section 50, while the second lower inflation portion 52 is located in a rear half of region the deployment section 50.

The first lower inflation portion 51 inflates at a position corresponding to the vehicle occupant seated in the front seat 13 (FIG. 1). The first lower inflation portion 51 further includes a sub inflation portion (first sub inflation portion) 53 located near the front edge of the front window 23 when the airbag 31 is in the deployed position. This first sub inflation portion 53 is designed to adjust the inner pressure of the first lower inflation portion 51, and it is located adjacent to the front end of the first lower inflation portion 51 and in communication with the first lower inflation portion 51 via a lower communication passage 54. The lower communication passage 54 is designed to provide a narrowed gas passage to limit a flow rate of the gas when the first lower inflation portion 51 is in the inflated position. The first sub inflation portion 53 is located in front of the vehicle occupant Mf (particularly an upper half portion of the vehicle occupant's body) seated in the front seat 13. Thus, the first sub inflation portion 53 is located at a considerable distance from the front seat 13 and inflatable in the vehicle width direction.

The second lower inflation portion 52 inflates at a position corresponding to the vehicle occupant seated in the rear seat 14 (FIG. 1). The second lower inflation portion 52 further includes a sub inflation portion (second sub inflation portion) 55 located near the front edge of the rear window 24 when the airbag 31 is in the deployed position. This second sub inflation portion 55 is designed to adjust the inner pressure of the second lower inflation portion 52, and it is located adjacent to the front end of the second lower inflation portion 52 and in communication with the second lower inflation portion 52 via a lower communication passage 56. The lower communication passage 56 is designed to provide a narrowed gas passage to limit the flow rate of the gas when the second lower inflation portion 52 is in the inflated position. The second sub inflation portion 55 is located in front of the vehicle occupant Mr (particularly an upper half portion of the vehicle occupant's body) seated in the rear seat 14. Thus, the second sub inflation portion 55 is located at a considerable distance from the rear seat 14 and inflatable in the vehicle width direction.

Namely, when the airbag 31 is in the deployed position, the first and second sub inflation portions 53 and 55 are located near the front edges of the windows 23 and 24. Thus, the instant embodiment can enhance the vehicle occupant protection effect or performance for protecting the vehicle occupants, particularly the vehicle occupants' heads, when the vehicle occupants Mf and Mr have been brought into secondary collisions against the neighborhoods of the front edges of the windows 23 and 24. Further, when the vehicle occupants Mf and Mr have hit the first and second lower inflation portions 51 and 52, the inner pressure of the first and second lower inflation portions 51 and 52 can be caused to escape to the first and second sub inflation portions 53 and 55. In this way, it is possible to prevent increase of the inner pressure of the first and second lower inflation portions 51 and 52.

The airbag 31 further includes a plurality of distortion restraint portions 57 for restraining the first and second lower inflation portions 51 and 52 from being distorted in the vehicle body front-rear direction when the airbag 31 has been deployed. The distortion restraint portions 57 are formed on the first and second lower inflation portions 51 and 52 in such a manner as to positionally correspond to at least intermediate positions of the upper large inflation portions 42, 43 and 44 arranged in the vehicle body front-rear direction. More specifically, the distortion restraint portions 57 extend straightly upward by predetermined lengths from the bottoms of the first and second lower inflation portions 51 and 52 and sub inflation portion 55. The distortion restraint portions 57 are formed, for example, by the two, i.e. outer and inner, flexible sheets, constituting the airbag 31, being sewn together, and the distortion restraint portions 57 function as reinforcing ribs.

When the plurality of upper large inflation portions 42, 43 and 44 have inflated, the first and second lower inflation portions 51 and 52, disposed under the gas introduction chamber 40, can be distorted (deformed) in the vehicle body front-rear direction due to the influence of the inflation of the inflation portions 42, 43 and 44.

Thus, the first embodiment is constructed in such a manner that the distortion restraint portions 57 can restrain the first and second lower inflation portions 51 and 52 from being distorted (deformed) in the vehicle body front-rear direction when the airbag 31 has been deployed in a curtain shape. Because distortion of the first and second lower inflation portions 51 and 52 can be restrained in the aforementioned manner, the airbag 31 would be much less likely to be distorted in its entirety in the vehicle body front-rear direction. Thus, even when the plurality of upper large inflation portions 42, 43 and 44, disposed over the first and second lower inflation portions 51 and 52, inflate, the airbag 31 would be much less likely to be distorted in its entirety. As a consequence, the instant embodiment can even further enhance the vehicle occupant protecting performance.

Further, the airbag 31 includes a plurality of upper mounting portions 61, a front mounting portion 62 and a rear mounting portion 63. The plurality of upper mounting portions 61 are in the form of mounting pieces extending upward from an upper end portion of the deployed airbag 31 and arranged along the roof side rail 18. The upper mounting portions 61 are each fixed to the roof side rail 18. The front mounting portion 62 is in the form of a mounting piece extending forward from a lower front end portion of the deployed airbag 31 and fixed to the front pillar 15. The rear mounting portion 63 is in the form of a mounting piece extending rearward from a lower rear end portion of the deployed airbag 31 and fixed to the rear pillar 17.

The following summarize the first embodiment, with reference to FIGS. 2 and 3.

The gas introduction chamber 40 extends in the vehicle body front-rear direction along the side portion 19a of the roof 19 (i.e., along the upper edges of the windows 23 and 24), and it includes the plurality of upper large inflation portions 42, 43 and 44 arranged in the vehicle body front-rear direction. The upper large inflation portions 42, 43 and 44 are disposed in correspondence with the respective positions of the pillars 15, 16 and 17.

Once the gas is introduced from the inflator 32 into the gas introduction chamber 40 in the event of an emergency (primary collision), such as a lateral collision or rollover of the vehicle 10, the airbag 31 is deployed downward in a curtain shape along the windows 23 and 24. As the gas flows from the gas introduction chamber 40 into the front and rear lower inflation portions 51 and 52, the front and rear lower inflation portions 51 and 52 inflate to protect the vehicle occupants Mf and Mr. At that time, the upper large inflation portions 42, 43 and 44 inflate in the vehicle width direction by a greater amount than the small inflation portions 45 and 46. Namely, the upper large inflation portions 42, 43 and 44 inflate greatly in the neighborhoods of the pillars 15, 16 and 17 and in the neighborhoods of the upper edges 23a and 24a of the windows 23 and 24.

Namely, according to the first embodiment, as the airbag 31 is deployed in a curtain shape, not only the front and rear lower inflation portions 51 and 52, disposed under the gas introduction chamber 40, inflate, but also the upper large inflation portions 42, 43 and 44 in the gas introduction chamber 40 inflate greatly in the vehicle width direction. The thus-inflated upper large inflation portions 42, 43 and 44 separate between upper portions of the pillars 15, 16 and 17 and neighborhoods thereof and the vehicle occupants Mf and Mr. Thus, the instant embodiment can enhance the vehicle occupant protection effect when the vehicle occupants Mf and Mr are brought into collisions against the inner surface of the side section of the vehicle body 11, i.e. at the time of a so-called secondary collision, following occurrence of a primary collision. Thus, in the event of an emergency, such as a lateral collision or rollover of the vehicle 10, the first embodiment can sufficiently protect the vehicle occupants Mf and Mr in the neighborhoods of the pillars 15, 16 and 17 and in the neighborhoods of the upper edges 23a and 24a of the windows 23 and 24.

Further, as noted above, the inflated upper large inflation portions 42, 43 and 44 abut against the plurality of pillars 15, 16 and 17. Thus, the entire airbag 31 is supported close to the vehicle occupants Mf and Mr by means of the pillars 15, 16 and 17. Further, when the vehicle occupants Mf and Mr are brought into secondary collisions against the pillars 15, 16 and 17, the first embodiment can restrain the entire airbag 31 from freely swinging in the vehicle width direction. Therefore, the first embodiment can advance the timing at which the vehicle occupants Mf and Mr should start to be restrained by the airbag 31.

Similarly, when the vehicle occupants Mf and Mr are just about to be brought into secondary collisions with the windows 23 and 23, the upper large inflation portions 42, 43 and 44, having high resistance against deformation, have already inflated between the pillars 15, 16 and 17 and windows 23 and 24 and the vehicle occupants Mf and Mr. Deformation amounts (stroke amounts) by which the upper large inflation portions 42, 43 and 44 are deformable in the vehicle width direction are great as compared to the small inflation portions 45 and 46. Thus, the instant embodiment can secure greater stroke amounts for the upper large inflation portions 42, 43 and 44 than for the small inflation portions 45 and 46, but also secure necessary gas flows into the lower inflation portions 51 and 52.

Further, as the airbag 31 is deployed in a curtain shape, the front-pillar large inflation portion 42 inflates to a region rearward of the front pillar 15 along the upper rear edge of the front pillar 15. The thus-inflated front-pillar large inflation portion 42 sufficiently separates between an upper portion of the pillar 15 and neighborhood thereof and the vehicle occupant Mf. As a result, the instant embodiment can enhance the vehicle occupant protection effect when the vehicle occupant Mf is brought into a collision against the inner side surface of the vehicle body 11, following occurrence of a primary collision. Thus, in the event of an emergency, such as a lateral collision or rollover of the vehicle 10, the first embodiment can sufficiently protect the vehicle occupant Mf in the neighborhoods of the front pillar 15 and upper edge 23a of the window 23.

Further, as the airbag 31 is deployed in a curtain shape, the rear-pillar large inflation portion 44 inflates to a region forward of the rear pillar 17 along the upper front edge of the rear pillar 17. The thus-inflated rear-pillar large inflation portion 44 sufficiently separates between an upper portion of the pillar 17 and neighborhood thereof and the vehicle occupant Mr. As a result, the instant embodiment can enhance the vehicle occupant protection effect when the vehicle occupant Mf is brought into a collision against the inner surface of the side section of the vehicle body 11, following occurrence of a primary collision. Thus, in the event of an emergency, such as a lateral collision or rollover of the vehicle 10, the first embodiment can sufficiently protect the vehicle occupant Mr in the neighborhoods of the front pillar 15 and upper edge 24a of the window 24.

Embodiment 2

Now, with reference to FIGS. 6 and 7, a description will be given about a second embodiment of the vehicle occupant protection apparatus 130, where the same members and elements as in the first embodiment shown in FIGS. 1 to 5 are indicated by the same reference numerals and characters and will not be described hereinbelow to avoid unnecessary duplication. (a) of FIG. 7 shows an airbag 131 deployed within the passenger compartment 12, and (b) of FIG. 7 shows the airbag 131 in the deployed position.

Figure 6:
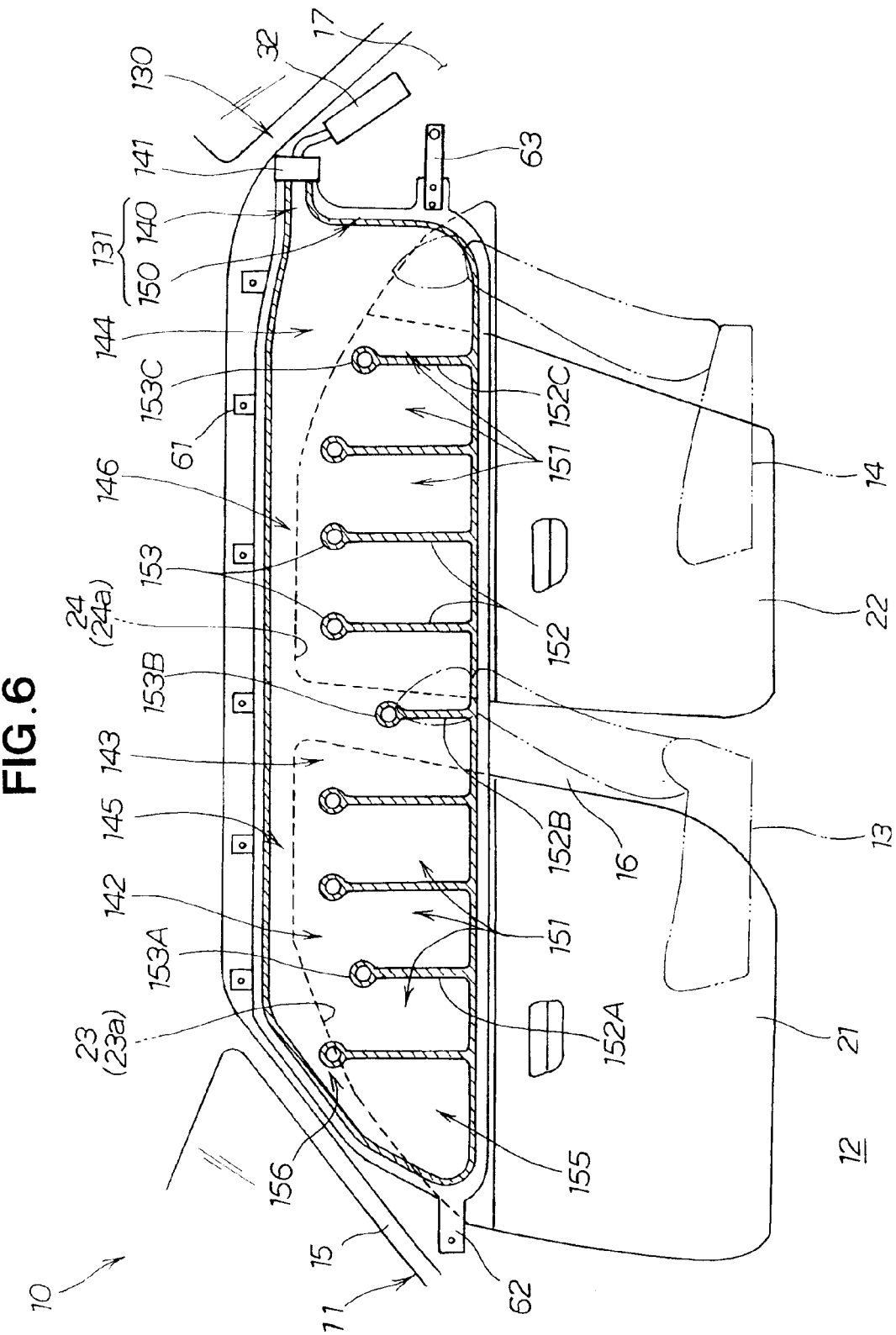
FIG. 6 is a side view showing a vehicle with a side curtain airbag, constituting a second embodiment of the vehicle occupant protection apparatus of the present invention, in a deployed position.
Figure 7:
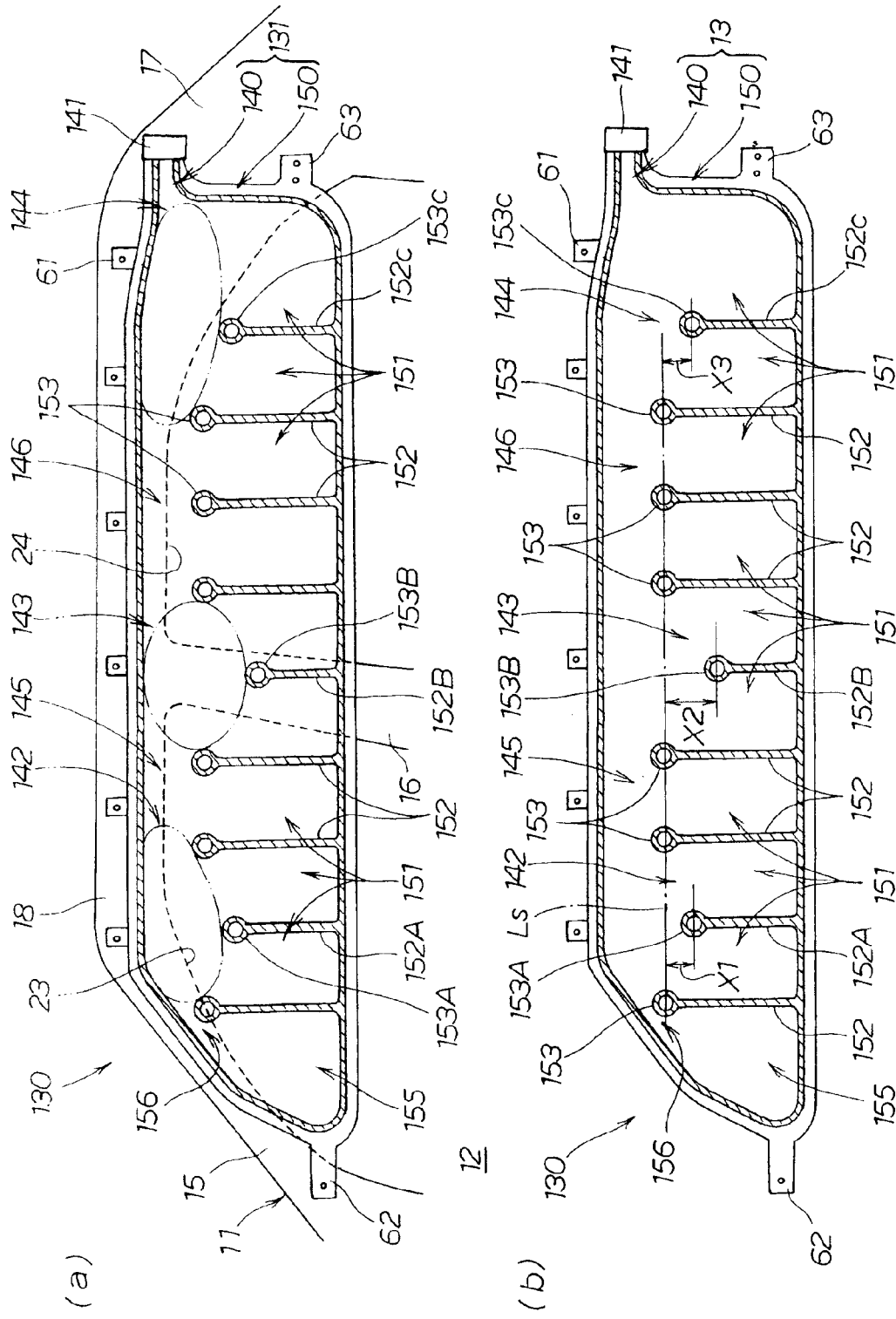
FIG. 7 is a view showing the side curtain airbag of FIG. 6 in a deployed position.

As shown in FIGS. 6 and 7, the second embodiment of the vehicle occupant protection apparatus 130 includes the airbag 131 that includes a gas introduction chamber 140 and a deployment section 150.

The gas introduction chamber 140 has a plurality of upper large inflation portions 142, 143 and 144 arranged in the vehicle body front-rear direction in such a manner that there are located in correspondence with the respective positions of the pillars 15, 16 and 17. The upper large inflation portions 142, 143 and 144 inflate in the vehicle width direction by a greater amount than small inflation portions 145 and 146 that are other inflation portions within the gas introduction chamber 140. The gas introduction chamber 140 has a gas inlet port 41 for introducing the gas.

The plurality of upper large inflation portions 142, 143 and 144 are a front-pillar large inflation portion 142, a center-pillar large inflation portion 143 and a rear-pillar large inflation portion 144.

The deployment section 150 is a sheet-shaped member that is deployable in a curtain shape along each of the windows 23 and 24 and thereby protects the vehicle occupants Mf and Mr. The deployment section 150 includes a plurality of lower inflation portions 151 that inflate with pressure of the gas as the deployment section 150 is deployed. These lower inflation portions 151 inflate greatly, in the vehicle width direction, under the gas introduction chamber 140, by the gas flowing from the gas introduction chamber 140 into the lower inflation portions 151. The lower inflation portions 151 are arranged in the vehicle body front-rear direction, and the lower inflation portions 151 are open at their upper ends 153 (including upper ends 153A to 153C) in such a manner that the gas flows branch downward from the gas introduction chamber 140, and the lower inflation portions 151 are closed at their lower ends.

Adjoining ones of the lower inflation portions 151 are partitioned off from each other by partition walls 152 (including partition walls 152A to 152C). The partition walls 152 are each a member provided in the deployment section 150 and extending straightly upward from near the bottom of the deployment section 150 to near the introduction chamber 140, and the partition walls 152 are each formed, for example, by the two, i.e. outer and inner, flexible sheets, constituting the airbag 131, being sewn together.

The partition walls 152 function also as the above-mentioned distortion restraint portions 57 provided in the first embodiment. Namely, the partition walls 152 restrain the lower inflation portions 151 from being distorted in the vehicle body front-rear direction when the airbag 131 has been deployed. For that purpose, the partition walls 152 are provided in the lower inflation portions 151 in such a manner so to positionally correspond to at least intermediate positions of the upper large inflation portions 142, 143 and 144 arranged in the vehicle body front-rear direction.

When the airbag 131 has been deployed, the partition walls 152 restrain the lower inflation portions 151 from being distorted in the vehicle body front-rear direction. Because distortion of each of the lower inflation portions 151 can be restrained like this, the entire airbag 131 would be much less likely to be distorted. Thus, even when the upper large inflation portions 142, 143 and 144, disposed over the lower inflation portions 151, have inflated, distortion of the entire airbag can be restrained. As a consequence, the second embodiment can even further enhance the vehicle occupant protection effect or performance by the airbag 131.

Of the plurality of partition walls 152, the partition walls 152A to 152C disposed immediately under the corresponding upper large inflation portions 142, 143 and 144 have their respective upper ends 153A to 153C located lower than upper ends 153 of the other partition walls. More specifically, when the airbag 131 is in the deployed position, the upper ends 153 of the partition walls 152 are located on a reference line Ls.

The upper end 153A of the partition wall 152A disposed immediately under the front-pillar large inflation portion 142 is located lower than the reference line Ls by a distance X1, so that a relatively large first space portion 142 is formed in a front region, in a longitudinal direction, of the gas introduction chamber 140. The first space portion 142 constitutes the front-pillar large inflation portion 142.

The upper end 153B of the partition wall 152B disposed immediately under the center-pillar large inflation portion 143 is located lower than the reference line Ls by a distance X2, so that a relatively large second space portion 143 is formed in a middle region, in the longitudinal direction, of the gas introduction chamber 140. The second space portion 143 constitutes the center-pillar large inflation portion 143.

The upper end 153C of the partition wall 152C disposed immediately under the rear-pillar large inflation portion 144 is located lower than the reference line Ls by a distance X3, so that a relatively large third space portion 144 is formed in a rear region, in the longitudinal direction, of the gas introduction chamber 140. The third space portion 144 constitutes the rear-pillar large inflation portion 144.

In the deployment section 150, the frontmost lower inflation portion 151 includes a sub inflation portion 155 that is located near the front edge of the front window 23 when the airbag 131 is in the deployed position. The sub inflation portion 155 is designed to adjust the inner pressure of the first lower inflation portions 151, and it is located adjacent to the front end of the foremost lower inflation portions 151 and in communication with the lower inflation portion 151 via a communication passage 156. The communication passage 156 provides a narrowed gas passage to limit the flow rate of the gas.

Namely, when the airbag 131 is in the deployed position, the sub inflation portion 155 is located near the front edge of the front window 23. Thus, the instant embodiment can even further enhance the vehicle occupant protection effect when the vehicle occupants Mf and Mr (see FIG. 1) have been brought into secondary collisions against the neighborhoods of the front edges of the windows 23 and 24. Further, when the vehicle occupants Mf and Mr have hit the lower inflation portions 151, e.g. when the vehicle occupants Mf and Mr have been brought into secondary collisions against the neighborhoods of the front edges of the windows 23 and 24, the inner pressure of the lower inflation portions 151 can be caused to escape to the sub inflation portion 155. In this way, it is possible to prevent increase of the inner pressure of the lower inflation portions 151.

The second embodiment can accomplish the same behavior and advantageous benefits as the first embodiment. Namely, the upper large inflation portions 142, 143 and 144 having inflated can separate between upper portions of the pillars 15, 16 and 17 and neighborhoods thereof and the vehicle occupants Mf and Mr. Thus, the instant embodiment can even further enhance the vehicle occupant protection effect when the vehicle occupants Mf and Mr are brought into collisions against the inner surface of the side section of the vehicle body 11, i.e. at the time of a so-called secondary collision, following occurrence of a primary collision. Thus, in the event of an emergency, such as a lateral collision or rollover of the vehicle 10, the second embodiment can sufficiently protect the vehicle occupants Mf and Mr in the neighborhoods of the pillars 15, 16 and 17 and in the neighborhoods of the upper edges of the windows 23 and 24.

Further, the inflated front-pillar large inflation portion 142 separates between an upper portion of the front pillar 15 and neighborhood thereof and the vehicle occupant Mf. As a result, the instant embodiment can enhance the vehicle occupant protection effect when the vehicle occupant Mf is brought into a collision against the inner side surface of the vehicle body 11, following occurrence of a primary collision. Thus, in the event of an emergency, such as a lateral collision or rollover of the vehicle 10, the second embodiment can sufficiently protect the vehicle occupant Mf in the neighborhoods of the front pillar 15 and upper edge of the window 23.

The inflated rear-pillar large inflation portion 144 separates between an upper portion of the rear pillar 17 and neighborhood thereof and the vehicle occupant Mr. As a result, the instant embodiment can enhance the vehicle occupant protection effect when the vehicle occupant Mr is brought into a collision against the inner side surface of the vehicle body 11, following occurrence of a primary collision. Thus, in the event of an emergency, such as a lateral collision or rollover of the vehicle 10, the second embodiment can sufficiently protect the vehicle occupant Mr in the neighborhoods of the rear pillar 17 and upper edge of the rear window 24.

Embodiment 3

Now, with reference to FIGS. 8 and 9, a description will be given about a third embodiment of the vehicle occupant protection apparatus, where the same members and elements as in the first embodiment shown in FIGS. 1 to 5 are indicated by the same reference numerals and characters and will not be described hereinbelow to avoid unnecessary duplication. (a) of FIG. 9 shows an airbag 231 deployed within the passenger compartment 12, and (b) of FIG. 9 shows the airbag 231 in the deployed position.

As shown in FIGS. 8 and 9, the third embodiment of the vehicle occupant protection apparatus 230 includes the airbag 231 that includes a gas introduction chamber 240 and a deployment section 250.

The gas introduction chamber 240 has a plurality of upper large inflation portions 242, 243 and 244 arranged in the vehicle body front-rear direction in such a manner that they are located in correspondence with respective positions of the pillars 15, 16 and 17. The upper large inflation portions 242, 243 and 244 inflate in the vehicle width direction by a greater amount than small inflation portions 245 and 246 that are other inflation portions within the gas introduction chamber 240. The gas introduction chamber 240 has a gas inlet port 241 for introducing the gas.

The plurality of upper large inflation portions 242, 243 and 244 are three upper large inflation portions, i.e. a front-pillar large inflation portion 242, a center-pillar large inflation portion 243 and a rear-pillar large inflation portion 244. The front-pillar large inflation portion 242 corresponds to the front-pillar large inflation portion 42 provided in the first embodiment, the center-pillar large inflation portion 243 corresponds to the center-pillar large inflation portion 43 provided in the first embodiment, and the rear-pillar large inflation portion 244 corresponds to the rear-pillar large inflation portion 44 provided in the first embodiment.

The deployment section 250 is a sheet-shaped member that is deployable in a curtain shape along each of the windows 23 and 24 and thereby protects the vehicle occupants Mf and Mr (FIG. 1). The deployment section 250 includes a plurality of lower inflation portions (main inflation portions) 251 and 252, e.g., two front lower inflation portions 251 and two rear front lower inflation portions 252, that inflate with pressure of the gas as the deployment section 250 is deployed. These lower inflation portions 251 and 252 inflate greatly, in the vehicle width direction, under the gas introduction chamber 240, by the gas flowing from the gas introduction chamber 240 into the lower inflation portions 251 and 252. The first lower inflation portions 251 are located in a front half region of the deployment section 250, while the second lower inflation portions 252 are located in a rear half region of the deployment section 250.

The first lower inflation portions 251 inflate at positions beside the front seat 13 (FIG. 1). The first lower inflation portions 251 includes a sub inflation portion (first sub inflation portion) 253 located near the front edge of the front window 23 when the airbag 231 is in the deployed position. This first sub inflation portion 253 is designed to adjust the inner pressure of the first lower inflation portions 251, and it is located adjacent to the front end of one of the first lower inflation portions 251 and in communication with the first lower inflation portions 251 via a communication passage 254 (narrowed portion 254). The communication passage 254 provides a narrowed gas passage to limit the flow rate of the gas. More specifically, the first sub inflation portion 253 is located in front of the vehicle occupant Mf (particularly the head of the vehicle occupant) seated in the front seat 13. Thus, the first sub inflation portion 253 is inflatable in the vehicle width direction at a position considerably distant from the front seat 13.

The second lower inflation portions 252 inflate at positions beside the rear seat 14 (FIG. 1). The second lower inflation portions 252 include a sub inflation portion (second sub inflation portion) 255 located near the front edge of the rear window 24 when the airbag 231 is in the deployed position. This second sub inflation portion 255 is designed to adjust the inner pressure of the second lower inflation portions 252, and it is located adjacent to the front end of one of the second lower inflation portions 252 and in communication with the second lower inflation portions 252 via a communication passage 256. The communication passage 256 provides a narrowed gas passage to limit the flow rate of the gas. More specifically, the second sub inflation portion 255 is located in front of the vehicle occupant Mr (particularly the head of the vehicle occupant) seated in the rear seat 14. Thus, the second sub inflation portion 255 is inflatable in the vehicle width direction at a position considerably distant from the rear seat 14.

Namely, when the airbag 231 is in the deployed position, the first and second sub inflation portions 253 and 255 are located near the front edges of the windows 23 and 24. Thus, the instant embodiment can enhance the vehicle occupant protection effect when the vehicle occupants Mf and Mr have been brought into secondary collisions against the neighborhoods of the front edges of the windows 23 and 24. Further, when the vehicle occupants Mf and Mr have hit the first and second lower inflation portions 251 and 252, e.g. when the vehicle occupants Mf and Mr have been brought into secondary collisions against the neighborhoods of the front edges of the windows 23 and 24, the inner pressure of the first and second lower inflation portions 251 and 252 can be caused to escape to the first and second sub inflation portions 253 and 255. In this way, it is possible to prevent increase of the inner pressure of the first and second lower inflation portions 251 and 252.

The airbag 231 further includes a plurality of distortion restraint portions 257 for restraining the first and second lower inflation portions 251 and 252 from being distorted in the vehicle body front-rear direction. The distortion restraint portions 257 are formed on the first and second lower inflation portions 251 and 252 and second sub inflation portion 255 in such a manner as to positionally correspond to at least intermediate positions of the upper large inflation portions 242, 243 and 244 arranged in the vehicle body front-rear direction. More specifically, the distortion restraint portions 257 are portions extending straightly upward by predetermined lengths from the bottom of the first and second lower inflation portions 251 and 252 and sub inflation portion 255. The distortion restraint portions 257 are formed, for example, by the two, i.e. outer and inner, flexible sheets, constituting the airbag 231, being sewn together.

The distortion restraint portions 257 restrain the first and second lower inflation portions 251 and 252 from being distorted in the vehicle body front-rear direction when the airbag 231 has deployed in a curtain shape. Because distortion of the first and second lower inflation portions 251 and 252 is restrained like this, the entire airbag 231 would be much less likely to be distorted in the vehicle body front-rear direction. Thus, even when the upper large inflation portions 242, 243 and 244, disposed over the first and second lower inflation portions 251 and 252, have inflated, the instant embodiment can restrain distortion of the entire airbag 231. As a result, the instant embodiment can even further enhance the vehicle occupant protection effect by the airbag 231.

The third embodiment can accomplish the same behavior and advantageous benefits as the first embodiment. Namely, the upper large inflation portions 242, 243 and 244 having inflated can separate between upper portions of the pillars 15, 16 and 17 and neighborhoods thereof and the vehicle occupants Mf and Mr. Thus, the instant embodiment can even further enhance the vehicle occupant protection effect when the vehicle occupants Mf and Mr are brought into collisions against the inner side surface the vehicle body 11, i.e. at the time of a so-called secondary collision, following occurrence of a primary collision. Thus, in the event of an emergency, such as a lateral collision or rollover of the vehicle 10, the third embodiment can sufficiently protect the vehicle occupants Mf and Mr in the neighborhoods of the pillars 15, 16 and 17 and in the neighborhoods of the upper edges of the windows 23 and 24.

Further, the inflated front-pillar large inflation portion 242 separates between an upper portion of the pillar 15 and neighborhood thereof and the vehicle occupant Mf. As a result, the instant embodiment can enhance the vehicle occupant protection effect when the vehicle occupant Mf is brought into a collision against the inner side surface of the vehicle body 11, following occurrence of a primary collision. Thus, in the event of an emergency, such as a lateral collision or rollover of the vehicle 10, the third embodiment can sufficiently protect the vehicle occupant Mf in the neighborhoods of the front pillar 15 and upper edge of the window 23.

The inflated rear-pillar large inflation portion 244 separates between an upper portion of the rear pillar 17 and neighborhood thereof and the vehicle occupant Mr. As a result, the instant embodiment can enhance the vehicle occupant protection effect when the vehicle occupant Mr is brought into a collision against the inner side surface of the vehicle body 11, following occurrence of a primary collision. Thus, in the event of an emergency, such as a lateral collision or rollover of the vehicle 10, the third embodiment can sufficiently protect the vehicle occupant Mr in the neighborhoods of the rear pillar 17 and upper edge of the rear window 24.

INDUSTRIAL APPLICABILITY

The vehicle occupant protection apparatus 30, 130 and 230 of the present invention are well suited for application to side curtain airbags of passenger vehicles, such as wagons and sedans.

LEGEND 10 vehicle
11 vehicle body
12 passenger compartment
15 front pillar
16 center pillar
17 rear pillar
19 roof
19a side portion
23, 24 window
30, 130, 230 vehicle occupant protection apparatus
31, 131, 231 side curtain airbag
32 inflator
40, 140, 240 gas introduction chamber
42, 142, 242 front-pillar large inflation portion
44, 144, 244 rear-pillar large inflation portion
45, 46, 145, 146, 245, 246 small inflation portion
51, 52, 151, 251, 252 lower inflation portion
53, 55, 155, 253, 255 sub inflation portion
57, 152, 257 distortion restraint portion
Mf, Mr vehicle occupant

The invention claimed is:

1. A vehicle occupant protection apparatus comprising:
a side curtain airbag stored folded along a side portion of a roof of a vehicle body; and
an inflator for supplying gas to the side curtain airbag so that the side curtain airbag is inflated and deployed in a curtain shape along an inner surface of a vehicle window,
the side curtain airbag including:
a gas introduction chamber extending in a front-rear direction of the vehicle body along the side portion of the roof, the gas introduction chamber introducing thereinto the gas in the front-rear direction of the vehicle body; and
a lower inflation portion inflatable under the gas introduction chamber by the gas flowing from the gas introduction chamber into the lower inflation portion, the gas introduction chamber including a plurality of upper large inflation portions arranged in the front-rear direction of the vehicle body, the plurality of upper large inflation portions are each disposed in a position that at least partially overlaps a position of a different one of a plurality of pillars of the vehicle body in the front-rear direction of the vehicle body, each of the plurality of upper large inflation portions being inflatable in a vehicle width direction by a greater amount than a small inflation portion that is another inflation portion than the upper large inflation portions in the gas introduction chamber.

2. The vehicle occupant protection apparatus according to claim 1, wherein the plurality of upper large inflation portions include a front-pillar large inflation portion that, as the side curtain airbag is deployed, inflates to a region rearward of a front pillar of the plurality of pillars of the vehicle body along a rear upper portion of the front pillar of the plurality of pillars, the front-pillar large inflation portion disposed in a position that partially overlaps a position of the front pillar of the plurality of pillars of the vehicle body.

3. The vehicle occupant protection apparatus according to claim 1, wherein the plurality of upper large inflation portions include a rear-pillar large inflation portion that, as the side curtain airbag is deployed, inflates to a region forward of a rear pillar of the plurality of pillars of the vehicle body along a front upper portion of the rear pillar of the plurality of pillars, the rear-pillar large inflation portion disposed in a position that partially overlaps a position of the rear pillar of the plurality of pillars of the vehicle body.

4. The vehicle occupant protection apparatus according to claim 1, wherein the side curtain airbag includes a distortion restraint portion for restraining the lower inflation portion from being distorted in the front-rear direction of the vehicle body when the side curtain airbag has been deployed, and the distortion restraint portion is formed on the lower inflation portion in such a manner so to positionally correspond to at least an intermediate position of the plurality of upper large inflation portions.

5. The vehicle occupant protection apparatus according to claim 1, wherein the lower inflation portion includes a sub inflation portion that is located near a front edge of the vehicle window when the side curtain airbag is in a deployed position.

6. The vehicle occupant protection apparatus according to claim 1, wherein the gas introduction chamber includes one small inflation portion disposed between each adjacent pair of upper large inflation portions, such that each upper large inflation portion communicates with each adjacent upper large inflation portion via one small inflation portion.

7. The vehicle occupant protection apparatus according to claim 1, wherein the lower inflation portion is inflatable in the vehicle width direction by a greater amount than the small inflation portion.

8. The vehicle occupant protection apparatus according to claim 1, wherein the gas introduction chamber defines a continuous gas passage in the front-rear direction of the vehicle body, the continuous gas passage provided by alternating upper large inflation portions and small inflation portions.

9. The vehicle occupant protection apparatus according to claim 8, wherein the lower inflation portion is inflatable in the vehicle width direction by a greater amount than the small inflation portion.

10. The vehicle occupant protection apparatus according to claim 1, wherein the lower inflation portion is inflatable in the vehicle width direction by a greater amount than the small inflation portion.

11. A vehicle occupant protection apparatus, comprising:
a side curtain airbag stored folded along a side portion of a roof of a vehicle body; and
an inflator for supplying gas to the side curtain airbag so that the side curtain airbag is inflated and deployed in a curtain shape along an inner surface of a vehicle window,
the side curtain airbag including:
a gas introduction chamber extending in a front-rear direction of the vehicle body along the side portion of the roof, the gas introduction chamber introducing thereinto the gas in the front-rear direction of the vehicle body; and
a lower inflation portion inflatable under the gas introduction chamber by the gas flowing from the gas introduction chamber into the lower inflation portion,
the gas introduction chamber including a plurality of upper large inflation portions arranged in the front-rear direction of the vehicle body, the plurality of upper large inflation portions including a front-pillar large inflation portion, a rear-pillar large inflation portion, and a center-pillar large inflation portion,
wherein, as the side curtain airbag is deployed, the front-pillar large inflation portion inflates to a region rearward of a front pillar of the plurality of pillars of the vehicle body from a position overlapping a rear upper portion of the front pillar, the rear-pillar large inflation portion inflates to a region forward of a rear pillar of the plurality of pillars of the vehicle body from a position overlapping a front upper portion of the rear pillar, and the center-pillar large inflation portion inflates to a region both forward and rearward of a center pillar of the plurality of pillars of the vehicle body from a position overlapping an upper portion of the center pillar, and
each of the plurality of upper large inflation portions being inflatable in a vehicle width direction by a greater amount than a small inflation portion that is another inflation portion than the upper large inflation portions in the gas introduction chamber.

12. The vehicle occupant protection apparatus according to claim 11, wherein the small inflation portion includes a first small inflation portion that defines a gas passage between the front-pillar large inflation portion and the center-pillar large inflation portion, and a second small inflation portion that defines a gas passage between the rear-pillar large inflation portion and the center-pillar large inflation portion.

* * * * *